J. CUSTER.
Land-Roller.

No. 55,826. Patented June 26, 1866.

Witnesses: Inventor:

UNITED STATES PATENT OFFICE.

JOHN CUSTER, OF SANDUSKY, OHIO.

IMPROVEMENT IN CULTIVATORS.

Specification forming part of Letters Patent No. 55,826, dated June 26, 1866.

*To all whom it may concern:*

Be it known that I, JOHN CUSTER, of Sandusky, in the county of Richland and State of Ohio, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1:
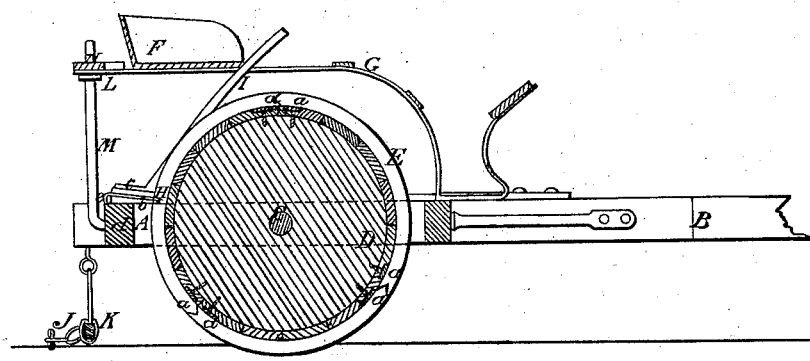
Figure 2:
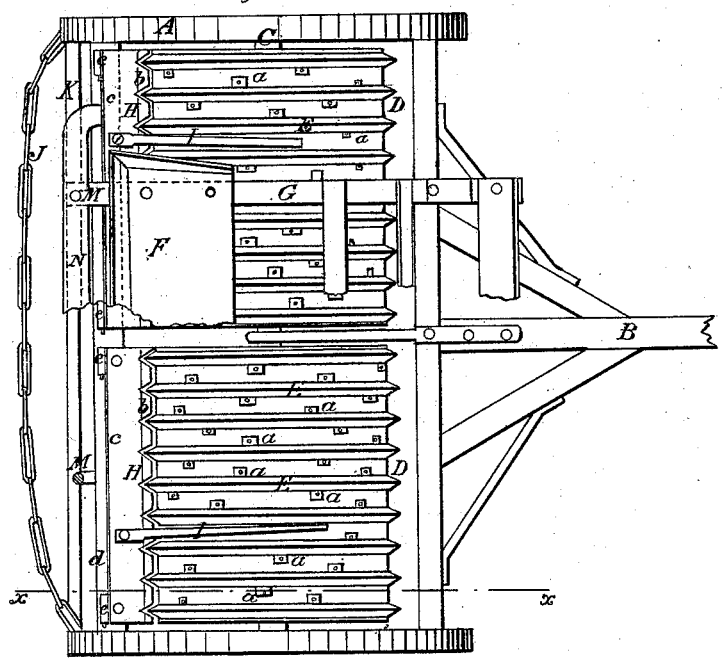

Figure 1 is a side sectional view of my invention, taken in the line $x\ x$, Fig. 2; Fig. 2, a plan or top view of the same.

Similar letters of reference indicate corresponding parts.

This invention relates to a new and improved device for crushing and cutting clods of earth after the ground has been plowed, and also for operating upon the ground after the sowing of grain, so that the latter will be left in the best possible condition to withstand frost.

The invention consists in placing circumferentially upon a roller a series of circular cutters of suitable dimensions and at a suitable distance apart, said rollers being placed in a rectangular frame, to which a draft-pole is attached, and the rollers provided with cleaners, all being arranged as hereinafter fully shown and described, whereby the desired end is attained.

A represents a rectangular frame, and B the draft-pole attached thereto. C is a shaft, which passes transversely through the frame A, and has two rollers, D D, placed loosely upon it. These rollers are equal in length and diameter, and may be constructed of wood or metal. The former material will probably be used.

On the rollers D D there are secured circumferentially metal cutters E, of trilateral form in their transverse section, their outer edges or peripheries being sharp to form cutting-edges. These cutters may be formed in sections, three to each, and each section having lips or flanges $a$, through which screws or bolts pass into the rollers. These cutters may be about three inches in depth or height, and they may be placed about three and one-fourth inches from center to center.

F represents the driver's seat, which is attached to elastic bars G G secured to the frame A. This seat is directly over the rear part of the frame A.

H H represent what may be termed "cleaners," employed for keeping the rollers free from dirt or soil. These cleaners are composed of metal plates $b$, notched or serrated so as to fit in the grooves between the cutters E, said plates being attached to wooden bars $c$, the ends of which are connected to the rear cross-bar, $d$, of the frame A by hinges $e$.

Each bar $c$ has a lever, I, attached to it, said levers extending up one at each side of the driver's seat F and within convenient reach of the driver thereon. By adjusting these levers the cleaners may be brought in contact with the rollers or moved off from them.

J is a chain, the ends of which are attached to the rear of the frame A. This chain serves as a drag, and it is kept distended by a bar, K, the ends of which are fitted in links in the chain.

The rear ends of the elastic bars G G rest on nuts L, which are fitted on screws cut on upright rods M, the lower ends of which are inserted in the rear cross-bar, $d$, the rods M passing up through the rear ends of the bars G G, and also through a bar, N, which serves as a rest for the levers I when thrown back.

The device is used as follows: After a field is plowed the device is drawn over it, and the cutters E break or crush the clods and leave the earth in small ridges and furrows. The grain is then sown broadcast, and the machine again passed over the ground in the same direction as before, and the grain will be covered in small drills and cannot be thrown out of the earth by the action of the frost.

The chain J is used as a seed-coverer during the first application

Having thus described my invention, I claim as new and desire to secure by Letters Patent—

1. The hinged cleaners H, in combination with the levers I, arranged to operate with the cutting-rollers D, in the manner and for the purpose herein specified.

2. The combination of the cutting-rollers D, hinged cleaners H, frame A, bar K, and chain J, arranged and operating as described.

JOHN CUSTER.

Witnesses:
M. R. HARDING,
G. W. CUSTER.